US008054182B2

(12) United States Patent
Cutchis (10) Patent No.: US 8,054,182 B2
(45) Date of Patent: Nov. 8, 2011

(54) REMOTELY DIRECTED VEHICLE INSPECTION METHOD AND APPARATUS

(75) Inventor: Protagoras N. Cutchis, Highland, MD (US)

(73) Assignee: The Johns Hopkins University, Baltimore, MD (US)

( * ) Notice: Subject to any disclaimer, the term of this patent is extended or adjusted under 35 U.S.C. 154(b) by 351 days.

(21) Appl. No.: 12/423,133

(22) Filed: Apr. 14, 2009

(65) Prior Publication Data

US 2009/0261966 A1 Oct. 22, 2009

Related U.S. Application Data

(60) Provisional application No. 61/045,430, filed on Apr. 16, 2008.

(51) Int. Cl.
*G08B 1/08* (2006.01)
(52) U.S. Cl. .......... 340/539.22; 340/521; 340/522; 340/540; 340/541; 348/143; 348/150; 348/158; 348/159; 600/127; 600/131; 600/160; 600/179; 600/508
(58) Field of Classification Search .......... 340/539.22, 340/521, 522, 540, 541; 348/143, 150, 158, 348/159; 600/127, 131, 160, 179, 508
See application file for complete search history.

(56) References Cited

U.S. PATENT DOCUMENTS

| | | |
|---|---|---|
| 3,835,837 A | 9/1974 | Peek |
| 4,353,152 A | 10/1982 | O'Connor et al. |
| 4,789,947 A | 12/1988 | Maciejczak |
| 4,949,186 A | 8/1990 | Peterson |
| 5,012,335 A | 4/1991 | Cohodar |
| 5,016,098 A | 5/1991 | Cooper et al. |
| 5,079,629 A | 1/1992 | Oz |
| 5,345,809 A | 9/1994 | Corrigan et al. |
| 5,508,735 A | 4/1996 | Mueller |
| 5,571,401 A | 11/1996 | Lewis et al. |
| 5,594,498 A | 1/1997 | Fraley |
| 5,652,849 A | 7/1997 | Conway et al. |
| 5,662,586 A | 9/1997 | Monroe et al. |
| 5,793,419 A | 8/1998 | Fraley |
| 6,234,006 B1 | 5/2001 | Sunshine et al. |
| 6,369,849 B1 * | 4/2002 | Rzyski ............................ 348/61 |
| 6,432,046 B1 * | 8/2002 | Yarush et al. ................. 600/179 |
| 6,491,647 B1 | 12/2002 | Bridger et al. |
| 6,529,620 B2 | 3/2003 | Thompson |
| 6,558,320 B1 | 5/2003 | Causey, III et al. |
| 6,574,672 B1 | 6/2003 | Mitchell et al. |
| 6,605,038 B1 | 8/2003 | Teller et al. |

(Continued)

FOREIGN PATENT DOCUMENTS

WO WO/99/08105 2/1999

*Primary Examiner* — Tai T Nguyen
(74) *Attorney, Agent, or Firm* — Albert J. Fasulo, II (57) ABSTRACT

A method of inspecting a vehicle, comprising providing at an inspection site a hand-held inspection wand that transceives audio-visual information with a command/remote site a safe distance from the inspection site and that is staffed by law enforcement personnel, stopping the vehicle at the remote site, instructing an occupant of the vehicle to exit the vehicle and grasp the wand, transmitting instructions from the command site to the occupant via the wand, that direct the occupant to capture video of the vehicle at the remote site using the wand, capturing video of the vehicle using the wand, transmitting the captured video from the wand to the command site, and displaying the transmitted captured video at the command site.

29 Claims, 9 Drawing Sheets

U.S. PATENT DOCUMENTS

| | | |
|---|---|---|
| 6,611,200 B2 | 8/2003 | Pressnall et al. |
| 6,741,274 B1 | 5/2004 | Stevenson |
| 6,847,394 B1 | 1/2005 | Hansen |
| 6,856,344 B2 | 2/2005 | Franz |
| 6,877,878 B2 | 4/2005 | Raskas |
| 6,982,930 B1 | 1/2006 | Hung |
| 7,068,301 B2 | 6/2006 | Thompson |
| 7,354,383 B2 | 4/2008 | Bardha |
| 7,431,696 B1 | 10/2008 | Brady et al. |
| 2002/0097321 A1 | 7/2002 | McBride |
| 2004/0050188 A1 | 3/2004 | Richards et al. |
| 2005/0200750 A1 | 9/2005 | Ollila |

* cited by examiner

REMOTELY DIRECTED VEHICLE INSPECTION METHOD AND APPARATUS

CROSS-REFERENCE TO RELATED APPLICATIONS

This application claims priority to U.S. Provisional Application Ser. No. 61/045,430, filed Apr. 16, 2008, which is incorporated herein by reference in its entirety.

BACKGROUND OF THE INVENTION

1. Field of the Invention

The present invention relates to remote inspections of vehicles, their occupants and contents.

2. Background

Terrorist attacks, including suicide bombings, directed against personnel and infrastructure are on the increase. Often, terrorists pack a vehicle, such as a car or truck, with explosives, and trigger the explosives as the vehicle is driven into a target. Targets include road side security check points staffed by security personnel who inspect vehicles and their occupants for suspicious activity and dangerous materials, such as explosives, or illicit drugs. Such security personnel, employing conventional inspection techniques, are in harms way because they are dangerously near the vehicle under inspection; likely, they will be killed when the vehicle is detonated. Accordingly, there is a need for security checkpoint systems and technique that enable security personnel to perform vehicle inspections at check points, while keeping the security personnel out of harms way.

SUMMARY OF THE INVENTION

Embodiments of the present invention satisfy the above need, while providing other advantages. Specifically, embodiments of the present invention enable security personnel staffing a command station or site (also referred to as the remote station or site) separated a safe distance from a vehicle inspection station or site to conduct an inspection of a vehicle that travels proximate the vehicle inspection site, such that if the vehicle were detonated during the inspection, the security personnel would remain uninjured.

An embodiment of the present invention includes a method of performing an inspection of a vehicle, comprising:

providing a vehicle inspection site proximate, e.g., in the path of, or along side, where the vehicle travels;

providing at the vehicle inspection site a hand-held portable inspection wand including a video camera that captures video in a field-of-view extending from an end of the wand, a speaker, a microphone, and transceiver components coupled with the video camera, speaker and microphone;

providing a command site separated a safe distance from the vehicle inspection site, the command site including equipment for displaying information and for transceiving information, including audio-visual information, with the wand;

staffing the command site with one or more personnel for commanding the inspection;

causing the vehicle to stop at the vehicle inspection site;

instructing an occupant of the vehicle to exit the stopped vehicle;

instructing the occupant to grasp the wand at the vehicle inspection site;

transmitting instructions from the command site to the occupant, over the safe distance and through the wand, that direct the occupant to capture video of the vehicle at the vehicle inspection site using the wand;

capturing video of the vehicle using the wand while the occupant uses the wand to inspect the vehicle responsive to the transmitted instructions;

transmitting the captured video from the wand to the command site; and displaying the transmitted captured video at the command site.

Further method, system and apparatus embodiments are apparent from the description below.

BRIEF DESCRIPTION OF THE DRAWINGS

Various embodiments are described below with reference to the drawings.

DETAILED DESCRIPTION OF THE DRAWINGS

1. Checkpoint System

Figure 1:
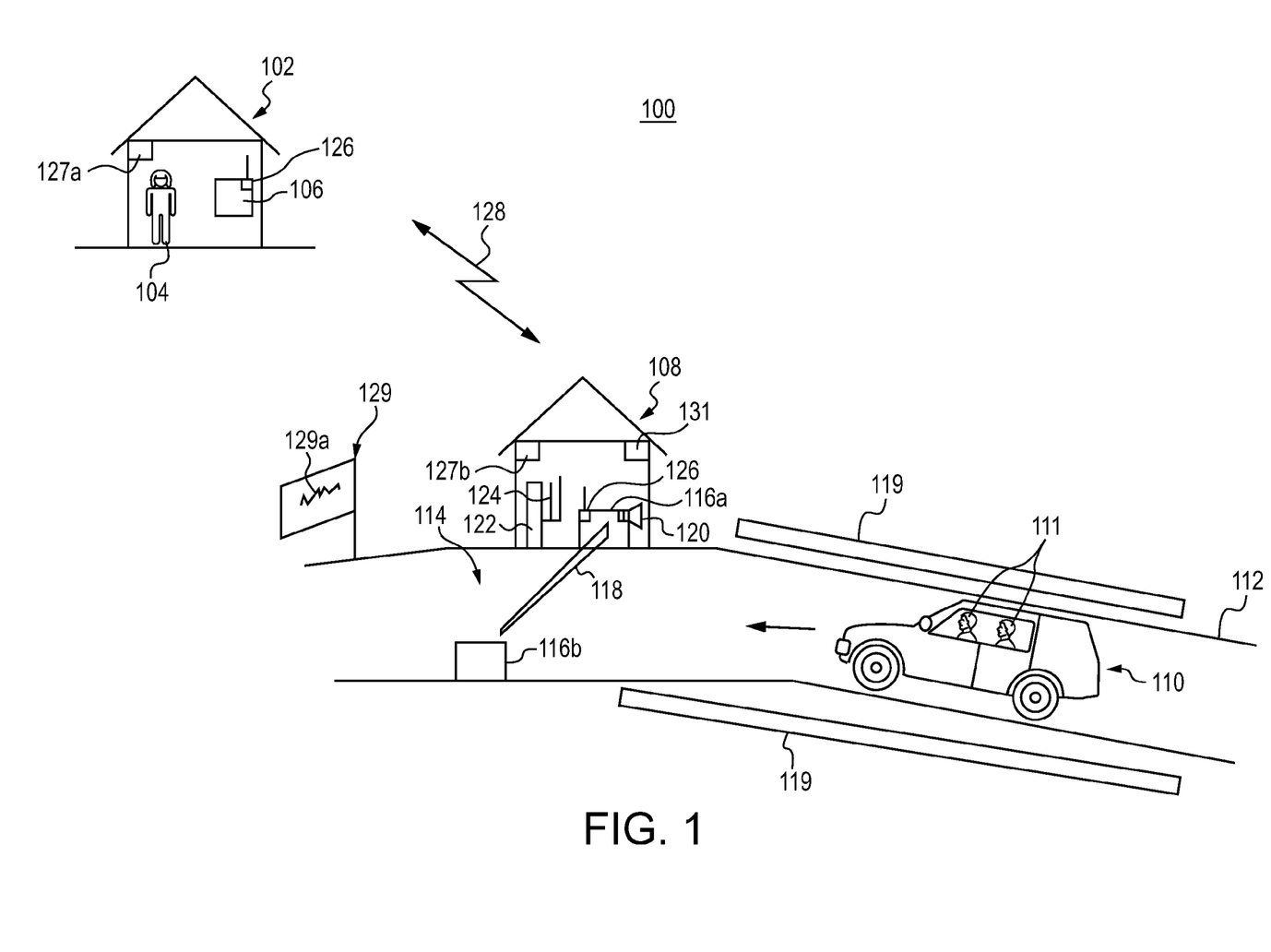
FIG. 1 is an example vehicle check point system incorporating features of the present invention.

FIG. 1 is an example vehicle check point system 100 (also referred to as check point 100) incorporating features of the present invention. Check point 100 includes a remote guard station or site 102 (also referred to herein as a command site) staffed by one or more guard personnel 104 who operate a console 106 constructed and operated in accordance with the present invention. Site 102 may include a protective edifice as depicted in FIG. 1, but in an alternative arrangement, site 102 can include merely a laptop computer, operating as console 106, and a guard interacting with the laptop. Check point 100 also includes a vehicle inspection station 108, separated a safe distance from remote guard station 102, for inspecting a vehicle 110, carrying occupants 111, that travels along a road 112 leading to the inspection station. A safe separation distance between stations 102 and 108 means a distance sufficiently large as to substantially reduce the impact of an exploding vehicle at or near station 108 on personnel 104 at station 102. A safe separation distance is at least 1000 feet.

Vehicle inspection station 108 includes a barricade 114 remotely controlled from remote station 102, and more specifically, via console 106 in station 102, so as to selectively block or allow the passage of vehicle 110 through station 108. Barricade 114 includes bollards 116a, 116b spaced apart across road 112, and a movable arm or gate 118, actuated at bollard 116a, extending between the bollards.

In an alternative arrangement, barricade 114 includes one or more sturdy (e.g., cement or steel, etc.), vertically displaceable, bollards embedded across road 112. In this arrangement, the bollards are movable in a vertical direction, under remote control from station 102, from (i) a stowed/retracted or hidden position, wherein the bollards are at or below a surface level of road 112 so as not to block the road, and (ii) a second deployed position wherein the bollards are extended (i.e., popped-up) above the road so as to block the road.

Side rails 119 may be disposed alongside road 112 as the road approaches barricade 114 so as to constrain the path of vehicle 110 to the road, i.e., to prevent the vehicle from easily bypassing inspection station 108.

Inspection station 108 includes a loud speaker 120 for providing audio commands to one or more vehicle occupants 111 under control of console 106, and a docking station 122 for retaining and battery charging a hand-held, portable vehicle inspection unit or wand 124 constructed and operated in accordance with the present invention. Both stations 102 and 108 include complementary wireless transceivers 126 for transceiving wireless signals 128 that carry information, including audio-visual information, and commands between the stations. In an arrangement, wireless signals 128 are communicated directly between a wireless transceiver in wand 124 and a wireless transceiver in console 106, without any other intermediary transceivers.

A relatively large sign 129 deployed at station 108 displays indicia 129a thereon large enough to be viewed by occupants 111 as vehicle 110 approaches station 108. In station 102, console 106 includes transceiver 126. In station 108, bollard 116a can include transceiver 126, which is coupled with speaker 120, actuating logic for gate 118, and docking station 122. Through transceivers 126, console 106 may transmit command signals to bollard 116a to open or close gate 118, or may transmit audio to speaker 120. In another arrangement, the above-described wireless link can be replaced by or augmented with a hard-wired link, e.g., electrical cables, for carrying the signals 128, as well as electrical power between stations 102 and 108 for powering the various station subsystem described herein.

In lieu of, or in addition to, speaker 120, stations 102 and 108 include a conventional two-way Public Announcement (PA) system 127, for transmitting and receiving (i.e., transceiving) audio signals to and from one station to the next, including PA components/transceivers, speakers and microphones 127a (in station 102) and 127b (in station 108) linked to each other wirelessly or by wire. In this way, personnel 104 at station 102 can exchange audio commands with individuals at station 108 over PA system 127, as would be appreciated by one of ordinary skill in the relevant arts.

Console 106 also includes electronics for remotely controlling, zooming, panning, or focusing, a wide FOV video camera 131 positioned at station 108. The wide FOV of camera 131 is directed to view barricade 114, road 112 leading to the barricade and surrounding areas. Video captured by camera 131 is relayed/fed to console 106 for display thereat, or at another separate video monitor, whereby personnel 104 can monitor a wide FOV encompassing vehicle 110 and its occupants 111 at or near station 108.

2. Hand-Held Inspection Wand

Figure 2:
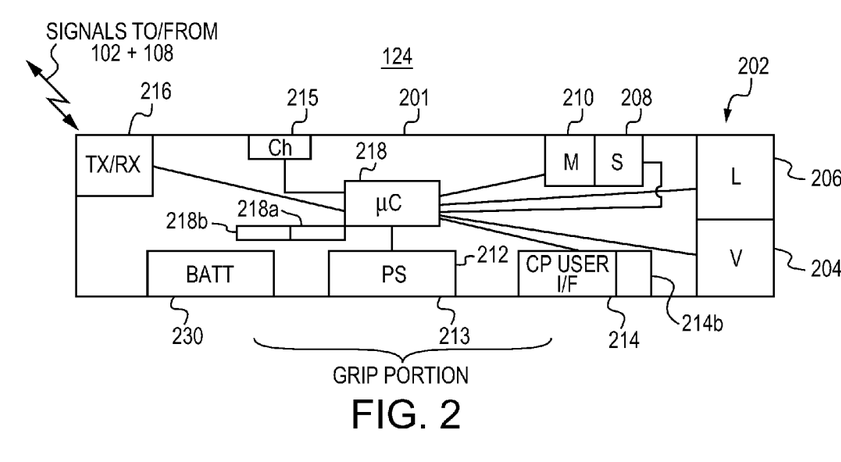
FIG. 2 is an example arrangement of a hand-held vehicle inspection unit or wand in accordance with the present invention.

FIG. 2 is an example arrangement of a hand-held vehicle inspection unit or wand 124, constructed, sized and shaped to be easily grasped in a hand of a person/user and wielded by that user. In an arrangement, wand 124 includes a housing 201 generally cylindrical in shape and sized to be grasped by hand, like a standard flashlight. A first or probe end 202 includes a color video camera 204 having a field-of-view (FOV) directed away from end 202 and for viewing scenes in that FOV. End 202 also includes a visible light source, e.g., lamp and lens, 206 configured to direct light at, and thereby illuminate, the FOV. The FOV is arranged so that the user can simply point end 202 of wand 124 in the direction of, i.e., toward, a target scene and the camera will capture a video of that scene.

Wand 124 includes a speaker 208, conformally embedded in housing 201, for providing, i.e., announcing, audio to a user of wand 124, and a microphone 210 for receiving audio from the user.

In an embodiment, wand 124 includes one or more physiological sensors 212, conformally mounted in housing 210, for covertly detecting/sensing one or more physiological parameters of the user, such as heart/pulse rate or moisture content from sweat, indicative of user stress. Sensor 212 includes a sensor pad 213 arranged at or near an outer surface of housing 201 so as to contact a portion of the user's hand, such as the user's palm or fingers when the user grasps wand 124. Sensors(s) 212 can include a pulse oximeter sensor and/or a galvanic skin response sensor. Relevant portions of conventional sensors that can be used in the present invention are, e.g., disclosed in U.S. Pat. Nos. 7,431,696, 6,491,647, 6,558,320, 6,982,930, and 7,354,383, each of which is incorporated herein by reference in its entirety. Sensor 212 is described in further detail below in connection with FIGS. 5A and 5B.

Wand 124 can also include a chemical sensor 215 for detecting chemicals, e.g., in a vapor state, indicative of explosives or other dangerous chemicals, including contraband chemicals, such as illicit drugs. Sensor 215 is described in further detail below in connection with FIGS. 6A and 6B.

Wand 124 includes a user interface 214 through which the user may provide input to control features of the wand, such as a volume of speaker 208, turn on and off light 206, and so on. User interface 214 can be a single console, including a keypad, or can include multiple, physically separated interface control components, such as switches, each associated with a respective component, e.g., speaker 208 or light 206, that it controls. In an alternative arrangement of wand 124, and system 100, wand 124 does not include control components in user interface 214; instead, a similar remote user control interface resides in remote console 106. In such an arrangement, personnel 104 control the functions of wand 124 remotely through this remote user control interface. In an arrangement of wand 124, user interface 214 includes a small display 214b, e.g., a 2 inch by 2 inch liquid crystal display, for displaying alpha-numeric indicia, such as instructions and commands, to a user of wand 124.

In another alternative arrangement, both wand 124 and console 106 can include control interfaces for both local or remote control of the functions of wand 124.

In an arrangement, wand 124 includes a transceiver 216 that wirelessly transceives signals, carrying information and commands, with transceivers 126 in stations 102 and 108. Any conventional wireless transceiving technology can be used to achieve this functionality. In an alternative arrangement, transceiver 216 may be hardwired to electronics at station 108.

In an arrangement, wand 124 includes an embedded controller 218, including associated memory 218a for storing instructions to be executed by the controller and information, and timer circuitry 218b, electrically coupled with the various wand components 204, 206, 208, 210, 212, 214 and 215, that controls overall operation of the components and exchanges control and information signals between them. Controller 218, coupled with its associated memory, executes program instructions that cause the controller to perform methods of the present invention. Controller 218 may include digital, analog, firmware, and/or a combination thereof. Each of the components 204, 206, 208, 210, 212, and 215 can incorporate an analog-to-digital converter (ADC) and/or digital-to-analog converter (DAC), as appropriate, to support a digital architecture and digital processing in unit 124, as would be appreciated by one of skill in the relevant arts.

In the arrangement depicted in FIG. 2, a battery 230 provides power to all electrical components of wand 124. Battery 230 includes connections enabling it to be electrically charged when seated in retainer 124 of station 108.

Figure 3:
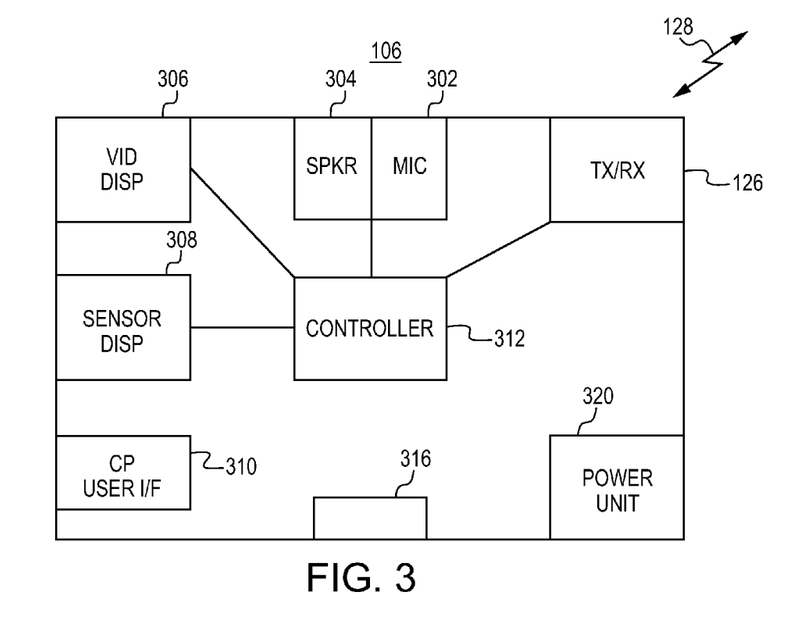
FIG. 3 is an example arrangement of a console deployed in a remote or command station of the check point system.
Figure 4:
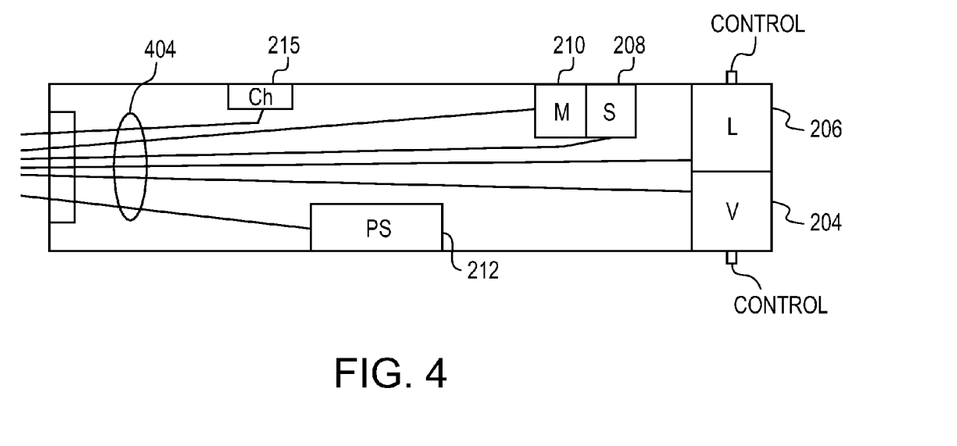
FIG. 4 is a diagram of an alternative arrangement of the wand.

An alternative simplified arrangement of unit 124 is depicted in FIG. 4, wherein each of the components 204, 206, 208, 210, 212, 214 and 215 transmits/receives its respective signal through a respective one of wires 404, which terminate at either station 102 or 108. In this arrangement of unit 124, each of the components is controlled individually at the component itself, e.g., audio control, light on/off switch, etc. Wires 404 can carry electrical power to each of the components of unit 124 depicted in FIG. 4. In addition, remote control of the components of unit 124 in FIG. 4 is provided through a remote control interface 316 of console 106 (see, e.g., console 106 in FIG. 3).

Figure 4A:
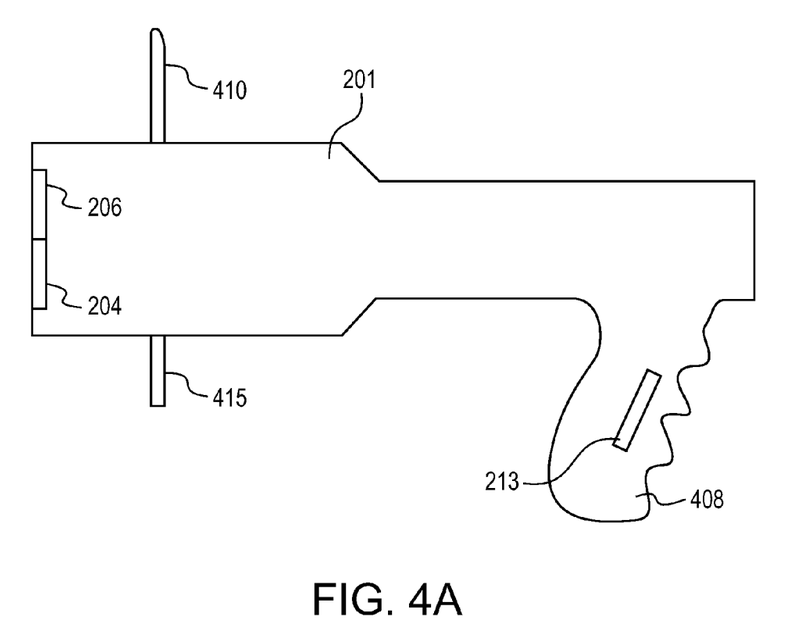
FIG. 4A is a cross-sectional perspective view of another example wand including a pistol grip.

FIG. 4A is a cross-sectional perspective view of another example wand 407. Wand 407 includes a pistol grip 408 that is grasped by a user. Wand 407 also includes an external antenna 410 coupled with wand transceiver 216. Wand 407 also includes an optional external chemical sniffer probe 415 coupled with chemical sensor subsystem 600.

Figure 5A:
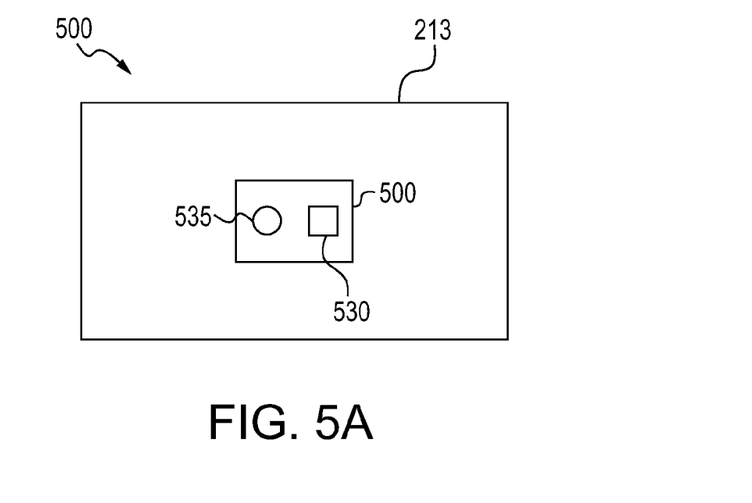
FIGS. 5A and 5B are diagrams of an example physiological sensor of the wand.
Figure 5B:
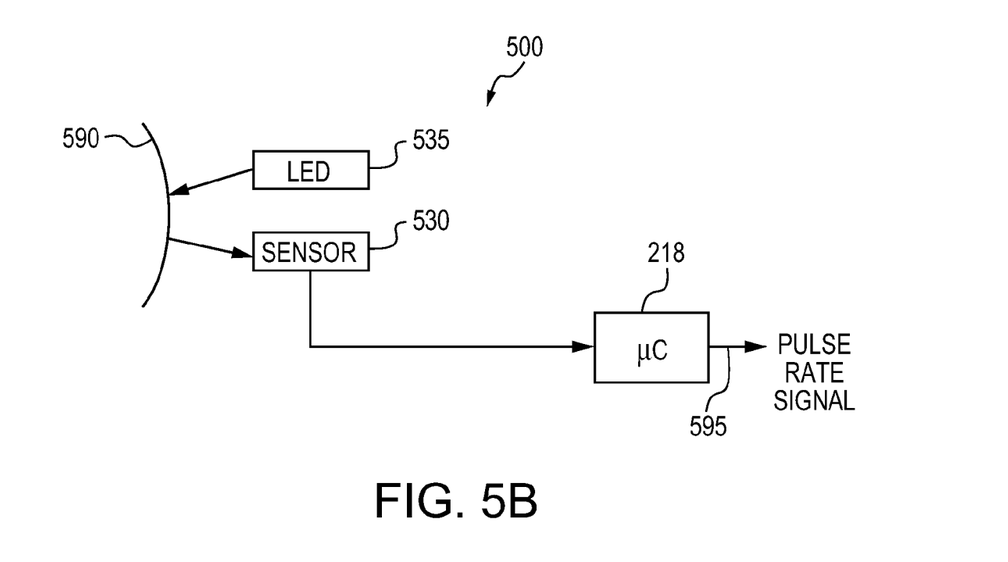

FIGS. 5A and 5B are diagrams of an example physiological sensor 500, corresponding to physiological sensor 212, for monitoring/sensing a pulse rate and a blood oxygenation level of a user grasping wand 124. With reference to FIG. 2 and both of FIGS. 5A and 5B, a user grasps wand 124 in such a way as to put a portion 590 of the user's hand in contact with a surface of pad 213 embedded in housing 201. A light source 535, e.g., a light emitting diode (LED), transmits light through at least one artery in the user's hand. A photodetector 530 detects the transmitted light and provides a detected signal indicative thereof to microcontroller 218 of wand 124. Microcontroller 218 determines a pulse rate based on the detected signal, and generates a pulse rate signal or message 595 indicative of the pulse rate and blood oxygenation level, and suitable for transmission from wand 124, via transceiver 216, to console 106 for display at the console. Except for any differences described above, physiological sensor 500 may be constructed and operated substantially in accordance with sensor 30, and its associated processing, described in detail in U.S. Pat. No. 7,431,696 to Brady et al., which is incorporated herein by reference in its entirety.

Figure 6A:
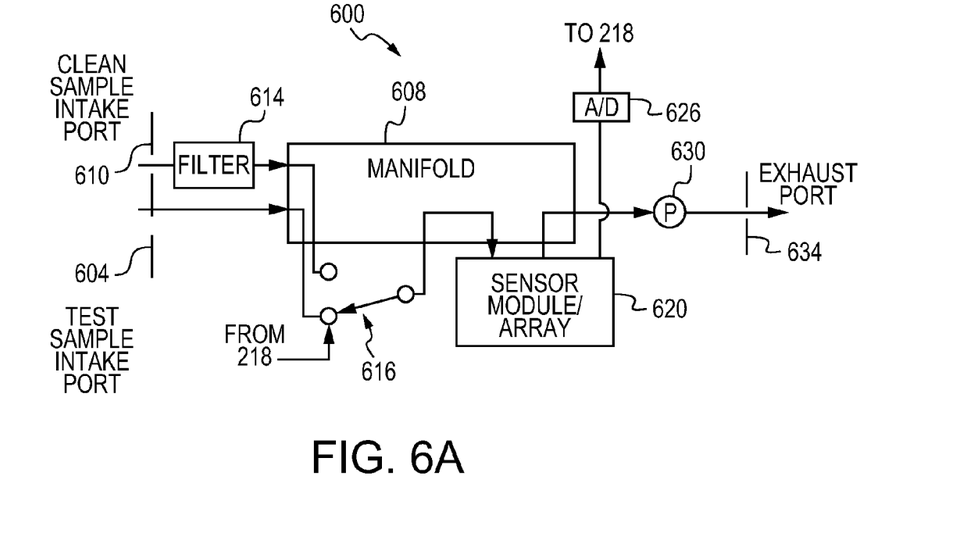
FIGS. 6A and 6B are diagrams of an example chemical sensor subsystem for monitoring/sensing one or more chemicals using the wand of the present invention.
Figure 6B:
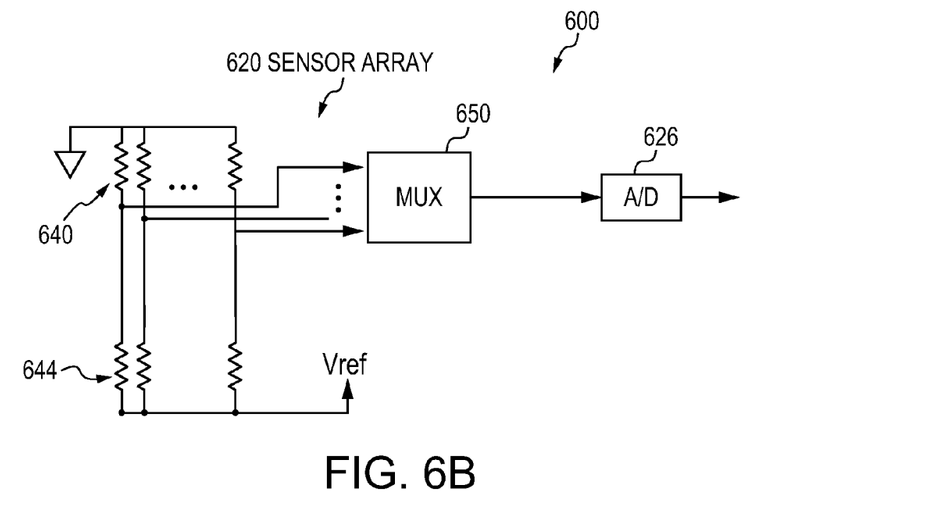

FIGS. 6A and 6B are diagrams of an example chemical sensor subsystem 600, corresponding to chemical sensor 215, for monitoring/sensing one or more chemicals using wand 124. With reference to FIG. 6A, housing 201 of wand 124 includes a test sample intake port 604 embedded therein through which a test sample is drawn and provided to a manifold 608. Similarly, housing 201 includes a reference or background intake port 610 therein through which a reference sample is drawn and provided through a filter 614 to manifold 608. Manifold 608 directs the test and reference samples to a solenoid 616 that selects one of the samples as the solenoid output under switching control of controller 218. Manifold 608 directs the selected sample to a sensor module 620 that detects analytes in the selected sample. Sensor module 620 includes multiple sensors that detect multiple analytes in the selected sample. Sensor module 620 generates a signal or signature indicative of the detected analytes, which is digitized by analog-to-digital (A/D) circuit 626. A/D 626 provides the digitized detected analyte signal to controller 218 for processing thereby, that is, controller 218 determines the presence of chemical(s) based on the digitized signal from A/D 626, and generates a message indicative of this determination for transmission, via transceiver 216, station 102 for display thereat. The selected sample is then provided from sensor module 620, through manifold 608, further through a miniature pump 630, and to/out an exhaust port 634 formed in housing 201.

FIG. 6B is an illustration of an exemplary arrangement of sensor module 620. Sensor module 620 includes multiple chemically sensitive resistors 640, each providing a particular characteristic response or signature when exposed to a test sample carrying analytes to be sensed. The circuitry depicted in FIG. 6B, in combination with controller 218, measures the resistances of the resistors 640 and processes the measurements to identify the test sample. Reference resistors 644, one per sense resistor 630, improve the performance of the sense resistors. A multiplexer 650 selects, in sequence, the chemically sensitive resistors 640. Except for the differences described above, chemical sensor subsystem 600, operating in conjunction with processor 218, may be constructed and operated substantially in accordance with chemical sensor 412, and controller 410, described in detail in U.S. Pat. No. 6,234,006 to Sunshine et al., which is incorporated herein by reference in its entirety. Chemically sensitive resistors, and systems and methods of using same for sensing chemicals, usable in the present invention, are disclosed in U.S. Pat. No. 5,571,401, and in PCT Patent Application Ser. No. WO99/08105, entitled "Techniques and Systems for Analyte Detection," published Feb. 19, 1999, each of which is incorporated herein by reference in its entirety. Example arrangements of sensor 600 detect chemicals indicative of dangerous substances, such as explosives, and illicit drugs.

3. Remote Station Console

FIG. 3 is an example arrangement of console 106 in remote station 102. Console 106 includes various console components, including transceiver 126 that communicates with its counterpart 216 in wand 124, a microphone 302 for transducing audio from personnel 104 that is destined for vehicle occupants 111 at station 108 (e.g., through PA system 127 or, alternatively, through wand 124), a speaker 304 for announcing audio received from occupants 111 at station 108, a video display 306 for displaying video captured/recorded by wand camera 204 and camera 131, a sensor display 308 for displaying one or more sensed physiological parameters and sensed chemical indicators measured by wand sensors 212, 215 a console user interface 310 through which personnel 104 can provide control inputs to the console components, and a controller 312 coupled with each of the aforementioned console components for controlling overall operation of the console and routing signals between the console components. Sensor indications may be displayed on video display 306 instead of separate display 308. Console 106 may include a conventional general purpose computer and display to provide many of the functions listed above. For example, console 106 may be a portable or laptop computer having a conventional wireless interface for communicating with wand 124. Controller 312, coupled with its associated memory, executes program instructions that cause the controller 312 to perform methods of the present invention, including transferring messages between the console transceiver 126 and the various other console components as necessary to effect these methods. Console 106 also includes a power unit 320 to power electrical subsystems of the console. Console 106 may be packaged in any convenient manner, including, for example, in a portable suitcase form factor, so that the console can be easily and quickly carried and deployed in remote territories.

Console 106 also includes a wand control user interface 316 for remote control of the functions of wand 124 by personnel 104. User interface 316 includes control interfaces similar to those of interface 214 described above in connection with FIG. 2.

Electrical communication between electrical components of station 102, e.g., console 106 and PA 127a, and electrical components at station 108, e.g., wand 124, bollard 116a, camera 131, and PA 127b, can be wireless, wired, or a combination of both, and is supported by the necessary wireless and/or wired transceivers, as would be appreciated by those having skills in the relevant arts.

As can be appreciated from the foregoing description, signals 128 represent a communication link between console 106 in station 102 and station 108, namely, wand transceiver 216 and/or transceiver 126 in station 108. Communication link 128 carries information, including audio-visual information, between wand 124 and console 106. In addition to audio-visual information, the information transmitted in the direction of wand 124 to console 106 includes messages indicating sensed physiological conditions, e.g., pulse rate, and sensed chemical(s), which are interpreted and displayed at console 106. In an arrangement of wand 124 including an alpha-numeric display, communication link 128 also carries alpha-numeric instructions transmitted from console 106 to wand 124.

4. Method Flowcharts

Figure 7:
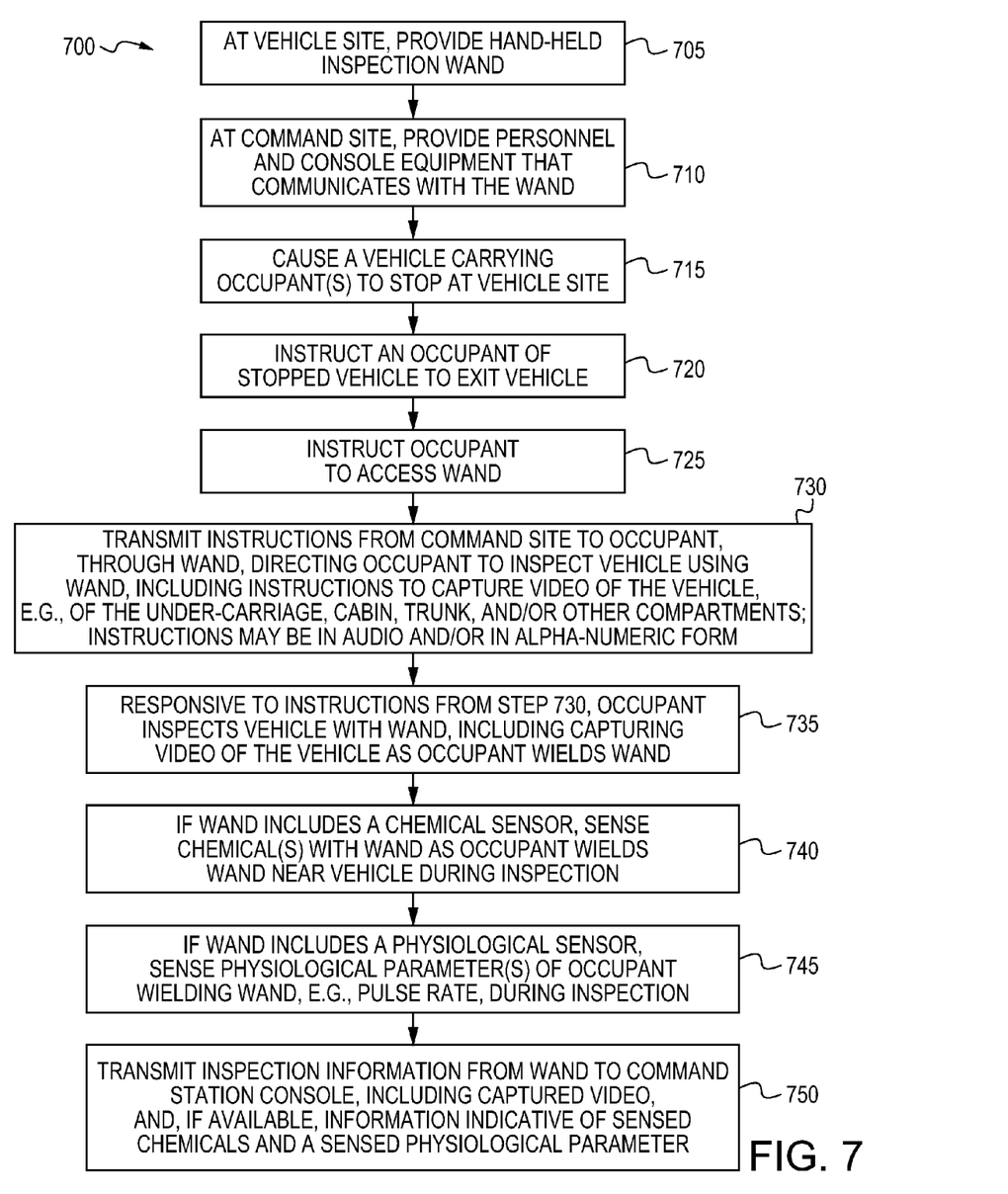
FIGS. 7 and 8 are flowcharts of example methods performed in a vehicle checkpoint system, namely, of performing a remotely commanded/controlled stop and search of a vehicle approaching a station in the check point system of FIG. 1.
Figure 8:
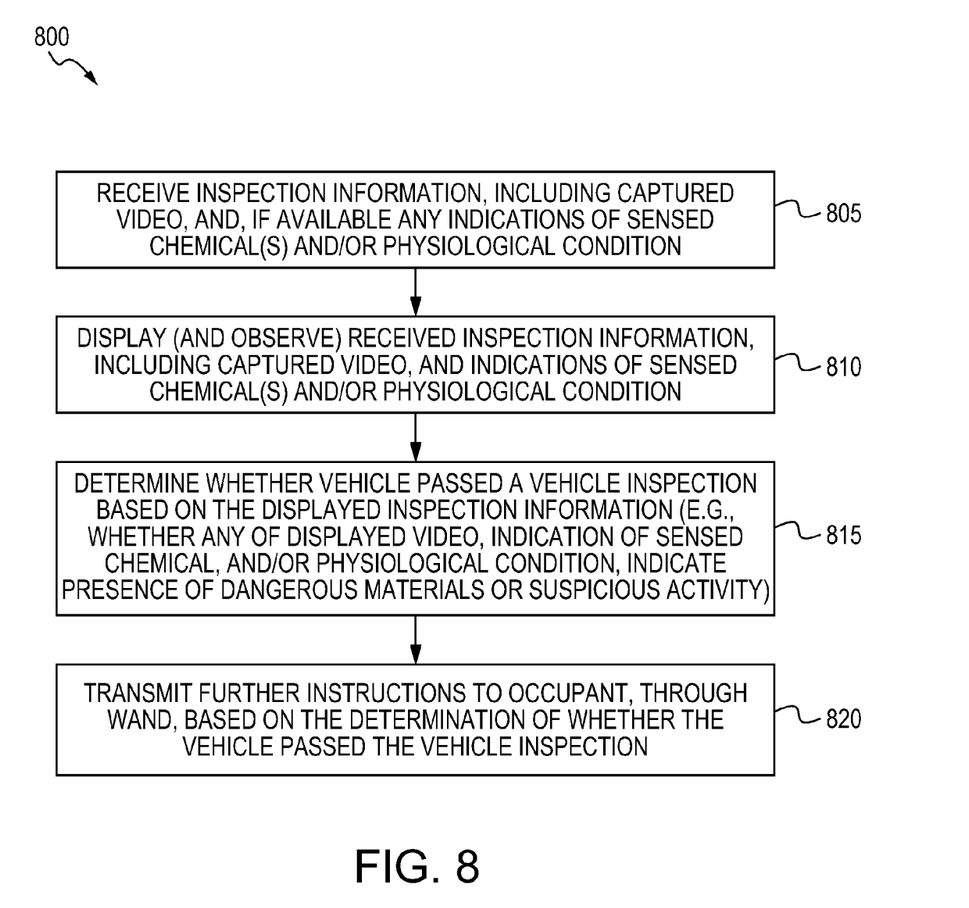

FIGS. 7 and 8 are flowcharts of example methods 700 and 800, respectively, performed in vehicle checkpoint system 100, namely, of performing a remotely commanded/controlled stop and search of vehicle 110 approaching station 108 from along road 112.

With reference to FIG. 7, in an initial step 705, system 100 is initially configured so that barricade 118 is positioned so as to block traffic traveling along road 110, e.g., gate 118 is in its lowered or closed position. In addition, hand-held unit/wand 124 is provided at station 108 in a stowed position in retainer 122.

In another initial step 710, one or more of the law enforcement or guard personnel 104 charged with performing inspections of vehicles at station 102, remotely, i.e., from the safety of remote station 108, are provided at remote station 102. For safety, no guard personnel are provided at station 102. Also, console 106 is provided at station 102 for interaction with personnel 104. Throughout the ensuing steps, personnel 104 can view activity at station 108 through video captured by camera 131 and transmitted to console 106 for display thereat. In addition, personnel 104 can transmit verbal/audio directions to station 108 through PA system 127, can transmit audio instructions to wand 124, and, in an arrangement of the wand including an alpha-numeric display, can transmit alpha-numeric instructions to the wand. Wand 124 can transmit audio and captured video to console 106.

In a step 715, vehicle 110 carrying one or more of the occupants 111 comes into the FOV of camera 131 as it approaches closed gate 118, and then comes to a stop at the gate, i.e., gate 118, and/or bollards are disposed as to cause vehicle 110 to stop at the gate. Also, indicia 129a on sign 129 can instruct occupants 111 to stop their vehicle.

In next steps 720 and 725, at least one of vehicle occupants 111 is instructed to exit stopped vehicle 110, walk to retainer 122, grasp hand-held unit 124, and remove the unit from the retainer. In these steps, instructions can be provided to occupants 111 to perform these tasks via (i) indicia 129a displayed on sign 129 and viewed by occupants 111 in stopped car 110, and/or (ii) audio instructions originated by personnel 104 and transmitted to station 108 over PA system 127. Occupants 111 can converse with personnel 104 over PA system 127.

In a next step 730, from the relative safety of station 102, personnel 104 command the occupant 111, in possession of wand 124 after step 725 (also referred to as the "user"), to inspect vehicle 110 to a desired level using wand 124. In support of this, personnel 104 transmit detailed audio instructions from station 102 to the user via, e.g., wireless signals 128 and through wand 124; audio signals from station 102 that are received at wand transceiver 216 are provided to wand speaker 208 and announced to user 111. In a reverse direction, the user 111 can provide audio feedback to personnel 104 by speaking into wand microphone 210, which transduces audio and provides same to wand transceiver 216, which transmits the audio signal to console transceiver 126, which provides the audio to speaker 304 of console 106. In this way, personnel 104 and user 111 can engage in a two-conversation, should the user need feedback and redirection from personnel 104 (e.g., personnel 104 can respond to audio inquiries—or even gestures viewed through camera 131—from the user, and give any number or level of detailed audio instructions to cause the user 111 to point wand 124 in a desired, open and close vehicle compartments, etc). In an arrangement of wand 124 including an alpha-numeric display, personnel 104 can also transmit alpha-numeric instructions to user 111 via wireless signals 128 and the wand. Also, at any step, personnel 104 can turn-on lamp 206 to illuminate a video FOV. At, or prior to, this step 730, personnel 104 ensure that the electrical components of wand 124, e.g., 204, 206, 208, 210, 212, 214, 215 and 218, are powered on.

In step 730, personnel 104 transmit instructions that command user 111 to perform a partial/quick or, alternatively, a complete video inspection of vehicle 110. For example, the instructions can direct user 111 to capture video of one or more of the entire vehicle cabin interior (including glove compartment and under seats), trunk, engine compartment, undercarriage, etc.

In a next step 735, responsive to the instructions of step 730, user 111 uses wand 124 to inspect vehicle 111, by pointing end 202 of the wand toward a target to be illuminated by light 206 and captured in the FOV of camera 206; in this way, wand 124 captures video of vehicle 111. The wand should be held within about less than 10 feet from the vehicle in order to capture clear video.

In a step 740 performed in connection with an arrangement of wand 124 including chemical sensor 215, wand 124 senses for the presence of chemical(s) (e.g., indicative of explosives and/or contraband, such as drugs) as user 111 wields the wand near vehicle 110 during step 735.

In a step 745 performed in connection with an arrangement of wand 124 including physiological sensor 212, the wand senses physiological parameter(s) of user 111 as the user wields the wand. For example, sensor 212 senses a pulse rate of user 111 from a palm of the user while the user grasps wand 124.

In a step 750, wand 124 transmits inspection information, including the video of vehicle 111 captured in step 735, to station 102, e.g., console 106, via communication link 128. Inspection information also includes indications of sensed chemical(s) and indications of sensed physiological parameters (e.g., pulse rate) as available from steps 740 and 745.

Throughout each of the steps 715-750 in method 700, personnel 104 charged with controlling/commanding the search are present only at the command site 102, not at site 102.

Method 800 is performed at station 102 and operates in conjunction with method 700. In a step 805, station 102, through console 106, receives the inspection information, e.g., captured videos, and indications of sensed chemical(s) and physiological parameters, if available.

In a step 810, console 106 displays the received inspection information, including the captured video and indications as available.

In a step 815, personnel 104 view the displayed inspection information and, based on these observations, as well as the audio from user 111, if any, determine whether the vehicle passed a vehicle inspection and whether to then allow vehicle 110 and its occupants to pass through station 108, i.e., to proceed along road 112. If the displayed inspection information indicates the presence of dangerous or contraband materials, such as explosives, drugs, etc., or suspicious behavior from occupants 111, then vehicle 110/occupants 111 will be deemed to have failed the inspection.

In an embodiment where user pulse rate is detected by wand 124, transmitted to station 102 and displayed thereat, personnel 104 monitor the displayed pulse rate against a pass/fail criteria in order to determine whether the inspection is passed in step 815. An example fail criterion is if the user's pulse rate increases more than 30% during the course of the inspection, e.g., from 90 beats/minute to approximately 120 beats/minute, indicating an unusually heightened level of anxiety in the user. Another example fail criterion is if the user's pulse rate exceeds 130 beats/minute.

In an embodiment where chemical(s) are sensed, an example fail criterion is if a displayed sensed chemical matches a chemical listed on a manifest of dangerous chemicals available to personnel 104. An example manifest would list chemicals indicative of dangerous or illegal substances, such as explosives and/or illegal drugs.

In a next step 820, if personnel 104 determine that vehicle 110 can pass, then personnel 104 transmit instructions to user 111 directing the user to return unit 124 to retainer 122, return to vehicle 110, and then proceed in vehicle 110. Personnel 104 enter a command at console 106 to remove the barricade, i.e., raise gate 118, so as to allow vehicle 110 to pass barricade 114. After vehicle 110 passes, then personnel 104 enter a command at console 106 to lower gate 118.

Conversely, if personnel 104 determine that vehicle 110 has failed inspection and, essentially, can not pass barricade 114, then personnel 104 transmit instructions to occupants 111 directing them to either remain in the vehicle or, alternatively, leave the vehicle, pending further action and instructions from personnel 104. Alternatively, vehicle 110 can be commanded to proceed through the barricade as if the inspection had passed, only to be subverted to another inspection station.

Throughout each of the steps in method 800, personnel 104 charged with controlling/commanding the search are present only at the command site 102, not at site 102.

Figure 9:
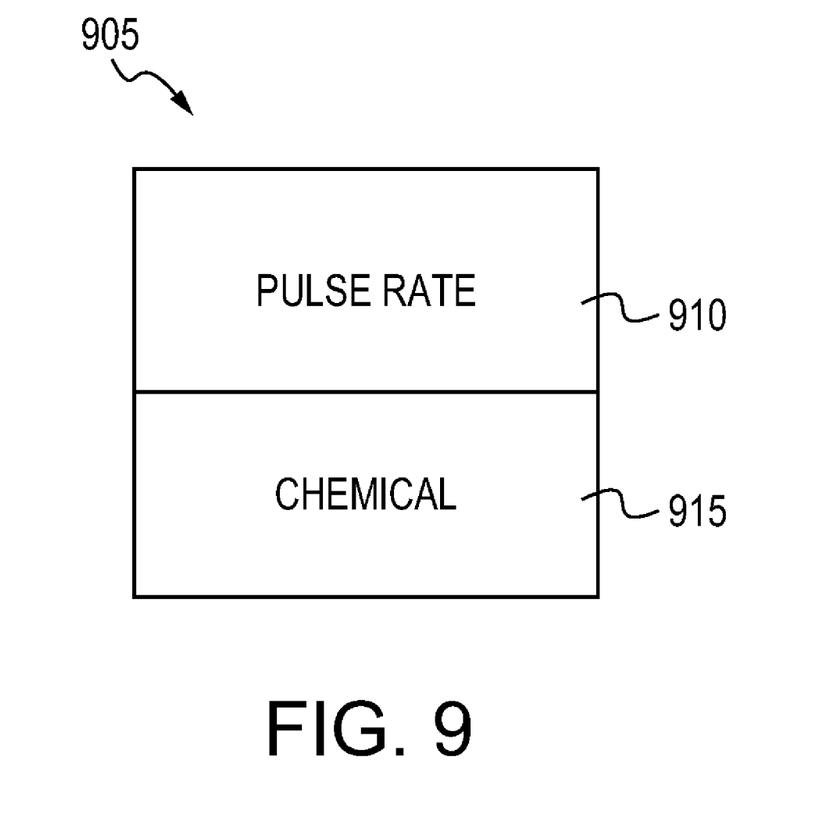
FIG. 9 is an example message packet transmitted from the wand to the console of FIG. 1.

FIG. 9 is an illustration of an example message packet 905 transmitted from wand 124 to console 106, over communication link 128. Message packet 905 includes a first field 910 including a value representative of a pulse rate and, in an arrangement of wand 124 that also includes chemical sensor, a second field 915 including an indicator of a type of chemical sensed by the chemical sensor, if any.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of performing an inspection of a vehicle, comprising:
   providing a vehicle inspection site proximate where the vehicle travels;
   providing at the vehicle inspection site a hand-held portable inspection wand including a video camera that captures video in a field-of-view extending from an end of the wand, a speaker, a microphone, and transceiver components coupled with the video camera, speaker and microphone;
   providing a command site separated a safe distance from the vehicle inspection site, the command site including equipment for displaying information and for transceiving information, including audio-visual information, with the wand;
   staffing the command site with one or more personnel for commanding the inspection;
   causing the vehicle to stop at the vehicle inspection site;
   instructing an occupant of the vehicle to exit the stopped vehicle;
   instructing the occupant to grasp the wand at the vehicle inspection site;
   transmitting instructions from the command site to the occupant, over the safe distance and through the wand, that direct the occupant to capture video of the vehicle at the vehicle inspection site using the wand;
   capturing video of the vehicle using the wand while the occupant uses the wand to inspect the vehicle responsive to the transmitted instructions;
   transmitting the captured video from the wand to the command site; and
   displaying the transmitted captured video at the command site.

2. The method of claim 1, further comprising:
   at the command site, observing the displayed captured video; and
   at the command site, determining whether the vehicle has passed the vehicle inspection based on the observed video.

3. The method of claim 2, wherein all of said steps of staffing, causing, instructing an occupant, instructing the occupant, transmitting instructions, capturing video, transmitting the captured video, displaying, observing and determining are performed while personnel for commanding the inspection are present only at the command site, not the inspection site.

4. The method of claim 2, further comprising:
   if it is determined that the vehicle passed the vehicle inspection, then transmitting instructions from the command site to the occupant, over the safe distance and through the wand, that direct the occupant to return to the vehicle and continue past the inspection site.

5. The method of claim 1, wherein said step of transmitting instructions includes wirelessly transmitting the instructions from the command site to the wand.

6. The method of claim 5, further comprising:
   prior to said step of wirelessly transmitting instructions, originating audio instructions at the command site,
   wherein said step of wirelessly transmitting instructions includes
      wirelessly transmitting the audio instructions originated at the command site to the wand, and
      announcing the audio instructions through the speaker of the wand.

7. The method of claim 5, wherein step of wirelessly transmitting instructions further comprises wirelessly transmitting from the command site to the occupant, through the wand:
an instruction that directs the occupant to capture video of the undercarriage of the vehicle; and
an instruction that directs the occupant to capture video of a cabin interior of the vehicle.

8. The method of claim 5, wherein said step of wirelessly transmitting instructions further comprises wirelessly transmitting from the command site to the occupant, through the wand:
an instruction to open a closed compartment of the vehicle and capture video of an interior of that compartment once opened.

9. The method of claim 5, wherein the wand further comprises a display, the method further comprising:
prior to said step of wirelessly transmitting instructions, originating alpha-numeric instructions at the command site,
wherein step wirelessly transmitting instructions comprises
wirelessly transmitting the alpha-numeric instructions originated at the command site to the wand, and
displaying the audio instructions on the wand display.

10. The method of claim 5, wherein the wand further comprises a physiological sensor for sensing a physiological condition while the wand is being grasped, the method further comprising:
sensing via the wand a physiological condition of the occupant while the occupant grasps the wand; and
wirelessly transmitting from the wand to the command site information indicative of the sensed physiological condition; and
at the command site, displaying a representation of the sensed physiological condition as indicated in the transmitted information.

11. The method of claim 10, wherein:
said sensing includes sensing a heart rate of the occupant; and
said displaying includes displaying a representation of the sensed heart rate.

12. The method of claim 10, further comprising:
at the command site, determining whether the vehicle has passed a vehicle inspection based on the displayed captured video and the displayed representation of the physiological condition.

13. The method of claim 10, wherein the wand further comprises a chemical sensor, the method further comprising:
sensing via the wand a presence of a chemical indicative of explosives;
transmitting information indicative of whether the chemical is sensed; and
at the command site, displaying a representation of whether the chemical is sensed as indicated in the information.

14. The method of claim 13, further comprising:
at the command site, determining whether the vehicle has passed a vehicle inspection based on
the displayed captured video,
the displayed representation of whether the chemical has been sensed, and
the displayed representation of the physiological condition.

15. The method of claim 5, wherein the wand further comprises a chemical sensor, the method further comprising:
sensing via the wand a presence of a chemical indicative of explosives;
transmitting information indicative of whether the chemical is sensed; and
at the command site, displaying a representation of whether the chemical is sensed as indicated in the information.

16. The method of claim 15, further comprising:
at the command site, determining whether the vehicle has passed a vehicle inspection based on the displayed captured video and the displayed representation of whether the chemical has been sensed.

17. The method of claim 1, wherein the safe distance separating the command station and the inspection site is at least 1000 feet.

18. The method of claim 1, further comprising:
at the command site, observing the displayed captured video; and
at the command site, determining whether the vehicle has passed the vehicle inspection based on the observed video.

19. The method of claim 18, further comprising:
if it is determined that the vehicle passed the vehicle inspection, then transmitting instructions from the command site to the occupant, over the safe distance and through the wand, that direct the occupant to return to the vehicle and continue past the inspection site.

20. The method of claim 18, further comprising:
providing the personnel at the command site but not at the inspection site,
wherein the personnel perform said step of determining at the command site.

21. The method of claim 1, wherein said causing step includes:
positioning a selectively removable obstruction in a path of the vehicle.

22. The method of claim 1, wherein said step of instructing the occupant of the vehicle to exit the vehicle includes displaying instructions on a sign in view of the occupant while the occupant is in the vehicle.

23. The method of claim 1, further comprising transmitting bi-directional audio signals between the wand and the console in support of a two-way conversation between the occupant at the inspection site and the personnel at the command station, in order to facilitate the vehicle inspection.

24. A method of performing a search, comprising:
at a vehicle inspection site, providing a hand-held portable inspection wand including a video camera that captures video in a field-of-view extending from an end of the wand, a speaker, a microphone, a physiological sensor positioned so as to be in contact with a hand when grasping the wand, a chemical sensor and transceiver components coupled at least indirectly with the video camera, speaker, microphone, physiological sensor and chemical sensor;
at a command site separated a safe distance of at least 1000 feet from the vehicle inspection site, providing one or more enforcement personnel and equipment for displaying information and for transceiving information, including audio-visual information, sensed physiological condition and sensed chemical information, with the wand;
causing the vehicle to stop at the vehicle inspection site;
instructing an occupant of the vehicle to exit the stopped vehicle;
instructing the occupant to grasp the wand at the vehicle inspection site;
wirelessly transmitting instructions from the command site to the occupant at the vehicle inspection site, over the safe distance and through the wand, that direct the occupant to inspect the vehicle using the wand, including capturing video of the vehicle using the wand;

capturing video of the vehicle using the wand responsive to the wirelessly transmitting step;

sensing via the wand a physiological condition of the occupant while the occupant grasps the wand;

sensing via the wand a chemical, if any, while the user inspects the vehicle;

transmitting the captured video from the wand to the command site;

transmitting from the wand to the command site information indicative of the sensed physiological condition;

transmitting from the wand to the command site information indicative of any sensed chemicals; and at the command site, displaying the transmitted captured video, the information indicative of the sensed physiological condition, and the information indicative of the sensed chemical, if any;

at the command site, determining whether the vehicle and occupant have passed a check-point inspection based on whether any of the displayed captured video, the displayed sensed physiological condition, and the displayed sensed chemical, if any, indicate any of suspicious activity and a presence of a dangerous material.

25. A portable, hand-held inspection wand, comprising:
a substantially elongate housing having a front-end, the elongate housing being sized and shaped to be grasped by a hand of a user of the wand;
a video camera operable to capture video in a field of view (FOV) of the video camera extending away from the housing front-end;
a lamp positioned on the housing that illuminates the FOV;
a physiological sensor that senses a physiological condition of the user from the hand when in contact with the housing, and that produces a signal indicative of the physiological condition;
a microphone in the housing for receiving an audio signal from the user;
a speaker in the housing for announcing an audio signal to the user;
transceiver components, coupled to the video camera, the physiological sensor, the microphone and the speaker, that
wirelessly transmit the video captured by the video camera,
wirelessly transmit the physiological condition signal, and
wirelessly transmit the audio signal received by the microphone, and
wirelessly receive the audio to be announced by the speaker; and
a power source for powering the video camera, the lamp, the microphone, the speaker, the physiological sensor and the transceiver components.

26. The wand of claim 25, further comprising:
a chemical sensor, coupled with the transceiver, for sensing chemicals and providing an indication of a sensed chemical, wherein the transceiver is configured to wirelessly transmit the indication of the sensed chemical.

27. A system for performing inspections, comprising:
(a) a portable hand-held wand, comprising:
a substantially elongate housing having a front-end, the housing being sized and shaped to be grasped by a hand of a user of the wand;
a video camera operable to capture video in a field of view (FOV) of the video camera extending away from the housing front-end;
a lamp positioned on the housing that illuminates the FOV;
a physiological sensor that senses a physiological condition of the user from the hand when in contact with the housing, and that produces a signal indicative of the physiological condition;
a microphone in the housing for receiving an audio signal from the user;
a speaker in the housing for announcing an audio signal to the user;
wireless transceiver components coupled to the video camera, the physiological sensor, the microphone and the speaker; and
(b) a console, comprising:
a microphone;
a speaker;
one or more displays; and
wireless transceiver components coupled to the console microphone, the console speaker and the console one or more displays, wherein
the video captured by the wand camera is wirelessly transmitted from the wand to the console, through the wand and console wireless transceiver components, and displayed on the console display,
audio sensed by the console microphone is wirelessly transmitted from the console to the wand, through the wand and console wireless transceiver components, and announced through the wand speaker,
audio sensed by the wand microphone is wirelessly transmitted from the wand to the console, through the wand and console wireless transceiver components, and announced through the console speaker, and
the signal indicative of the physiological condition is wirelessly transmitted from wand to the console, through the wand and console wireless transceiver components, and displayed on the one or more console displays.

28. The system of claim 27, wherein the wand further comprises a chemical sensor for sensing one or more chemicals indicative of dangerous or illicit materials, and for producing a signal indicative of the sensed chemical, wherein the wand wireless transceiver components transmit the signal indicative of the sensed chemicals.

29. The system of claim 28, wherein the console
wireless transceiver components receive the signal indicative of the sensed chemicals, and
the console one or more displays display the indication of sensed chemicals.

* * * * *